(12) United States Patent
Ahlberg (10) Patent No.: US 8,640,811 B2
(45) Date of Patent: Feb. 4, 2014

(54) FRAME-STEERED VEHICLE AND A METHOD FOR CONTROLLING A FRAME-STEERED VEHICLE

(75) Inventor: Jörgen Ahlberg, Växjö (SE)

(73) Assignee: Volvo Construction Equipment AB, Eskilstuna (SE)

(*) Notice: Subject to any disclaimer, the term of this patent is extended or adjusted under 35 U.S.C. 154(b) by 40 days.

(21) Appl. No.: 13/056,678

(22) PCT Filed: Aug. 29, 2008

(86) PCT No.: PCT/SE2008/000486
§ 371 (c)(1),
(2), (4) Date: Jan. 31, 2011

(87) PCT Pub. No.: WO2010/024735
PCT Pub. Date: Mar. 4, 2010

(65) Prior Publication Data
US 2011/0127100 A1    Jun. 2, 2011

(51) Int. Cl.
*B60K 17/34* (2006.01)
(52) U.S. Cl.
USPC ............................ 180/235; 180/247; 180/249
(58) Field of Classification Search
USPC .......................................... 180/235, 247, 249
See application file for complete search history.

(56) References Cited

U.S. PATENT DOCUMENTS

| 5,168,955 | A  | * | 12/1992 | Naito ............................ 180/197 |
| 5,860,889 | A  | * | 1/1999  | Schlosser et al. ............. 475/221 |
| 6,631,320 | B1 |   | 10/2003 | Holt et al. |
| 6,877,573 | B2 | * | 4/2005  | Hasegawa .................. 180/24.09 |
| 7,195,579 | B2 | * | 3/2007  | Claussen et al. ................ 477/35 |

FOREIGN PATENT DOCUMENTS

| WO | 2006068560 A1 | 6/2006 |
| WO | 2007035145 A1 | 3/2007 |

OTHER PUBLICATIONS

International Search Report for corresponding International Application PCT/SE2008/000486.
International Preliminary Report on Patentabilty for corresponding International Application PCT/SE2008/00486.

* cited by examiner

Primary Examiner — Tashiana Adams
Assistant Examiner — Marlon Arce
(74) Attorney, Agent, or Firm — WRB-IP LLP (57) ABSTRACT

A frame-steered vehicle includes a powertrain configured to provide drive torque to a transverse axle in a front vehicle section and at least one transverse axle in a rear vehicle section. At least one longitudinal drive shaft is connected to the at least one transverse axle in the rear vehicle section. At least one controllable longitudinal clutch is variably adjustable between an engaged operational state and a disengaged operational state is arranged in the at least one longitudinal drive shaft.

18 Claims, 5 Drawing Sheets

FRAME-STEERED VEHICLE AND A METHOD FOR CONTROLLING A FRAME-STEERED VEHICLE

BACKGROUND AND SUMMARY

The invention relates to a frame-steered vehicle and to a method for controlling a frame-steered vehicle.

A fundamental problem in all vehicles with drive to multiple ground contact surfaces is how the driving force is distributed. It is desirable to control the speed of the wheels so that the wheel slip in the longitudinal direction is the same at all ground contact surfaces, since excessive wheel slip at individual ground contact surfaces is thereby prevented. The wheel slip is the scaled difference between the speed of the wheel at the ground contact surface and speed of the ground at the same point. Low tractive force at contact surfaces with low friction is automatically compensated for by increased tractive force at contact surfaces with high friction.

Given similar ground conditions, the coefficients of friction utilized will be approximately the same regardless of the prevailing vertical load at each ground contact surface. This means that the tractive force is automatically distributed in proportion to the vertical load, which gives optimum efficiency in transmitting force to the ground.

One easy way of producing the desired equality in longitudinal slip is to mechanically connect the driving of all wheels in the powertrain. Problems arise, however, when cornering. In this context the ground will move at different speeds at the various ground contact surfaces. When discussing the speed of the ground, it is herein intended the speed of the ground relative to the vehicle. The ground under the outer wheels moves at a higher speed than the corresponding inner wheels, since the outer wheels have a greater distance to cover in the same time as the inner wheels.

For the same reason the ground under the front wheels generally moves at a higher speed than under the rear wheels. In certain articulated vehicles, such as loaders, the drive to the front and rear axle is mechanically linked. The aim is to eliminate the problem of different speeds under the two axles by placing the steering joint midway between the front and rear axle, which when driving with a constant radius of curvature gives the same ground speed under both axles.

The rotational speeds are the same due to the mechanically linked drive. With superelevation of the stationary vehicle, however, which is a common working situation for loaders, the two axles will be drawn closer to one another, which mean that the ground under each axle moves in opposite directions. This results in slipping at the ground contact surfaces and loads in the powertrain that will reduce its service life. There is obviously also the outstanding inner/outer wheel problem.

In the majority of vehicles, such as four-wheel drive cars, trucks with 4×4 and 6×6 drive and articulated transport vehicles, the vehicle concepts are such that it is impossible to alleviate the front/rear axle problem through suitable locating of the steering joint.

In straight-line driving no losses are sustained, since the difference in rotational speed is zero. The problem of also distributing the tractive force when cornering is conventionally solved by dividing the torque in a specific ratio by means of a differential. The rotational speed is then controlled by the speed of the ground at the various contact surfaces and by the wheel slip. The fact that wheel slip is not controllable, however, is a disadvantage.

If the product of the vertical load and the ground friction does not correspond to the torque ratio in the differential, the wheel slip may increase uncontrollably, the wheel slip and the total tractive force transmitted is limited by the slipping ground contact surface.

The difficulty of the uncontrolled wheel slip is usually alleviated by various measures for braking the wheel slip, for example by using so-called differential locks. A dog clutch which mechanically locks the differential is the oldest and still perhaps the most common solution. The disadvantage is that the speed differential when cornering manifests itself as wheel slip at the actual ground contact surfaces. This produces great torque loads, which shortens powertrain service lives, increases losses and results in heavy tire wear.

Another solution aimed at limiting the slip in the case of differentials is to use the service brake to decrease torque at the slipping ground contact surface and thereby control the slip. The difference in rotational speed in braking corresponds to the vehicle speed, which can result in certain losses.

The brake torque may instead be applied inside the rotating differential, wherein the difference in rotational speed will correspond to the difference in the curve radius.

Mobile work machines are vehicles designed for and used in rough off-road surroundings where trucks or passenger cars are inoperative and would be damaged when exposed to these rough conditions. In order to facilitate off-road performance and ability to successfully handle slippery conditions a work machine can be equipped with two or more driven axles. However, when the axles are interlocked to improve traction, the drivability will suffer. In order to improve driveability, especially when turning, different speed of the wheel axles must be allowed.

An electronic traction control system for articulated work machines comprising two axles is described in U.S. Pat. No. 6,631,320 B1. In order to prevent tire slip in slippery conditions the automatic controlling algorithms calculate a desired speed of a wheel and use the brake in order to make the wheel to rotate with the desired speed.

WO 2007/035145 A1 discloses a method of controlling the speed of the wheels during cornering with an articulated hauler. The speed of the front wheels is allowed to be different from the wheels of the rear axles when the vehicle is cornering.

It is desirable to provide a frame-steered vehicle which allows for an improved control of a speed of the vehicle's ground engagement element axles. It is also desirable to provide an improved method for controlling a frame-steered vehicle.

According to an aspect of the present invention, a frame-steered vehicle is provided comprising a powertrain configured to provide drive torque to a transverse axle in a front vehicle section and at least one transverse axle in a rear vehicle section, wherein at least one longitudinal drive shaft is connected to the at least one transverse axle in the rear vehicle section. At least one controllable longitudinal clutch being variably adjustable between an engaged operational state and a disengaged operational state is arranged in the at least one longitudinal drive shaft.

The variation of the torque and/or rotational speed can be performed stepwise, infinitely, linearly or nonlinearly. It is also possible to perform the variation by combining two or more of those manners of variation, e.g. by using a different kind of variation manners in different torque ranges.

According to a favourable embodiment of the invention, the at least one controllable clutch is embodied to variably transmit torque and/or rotational speed in a predefined range of torque.

According to a favourable embodiment of the invention, the at least one controllable clutch is embodied to variably transmit infinitely torque and/or rotational speed in a predefined range of torque and/or rotational speed.

According to a favourable embodiment of the invention, a torque is variably controllable by the at least one controllable clutch.

According to a favourable embodiment of the invention, a rotational speed of the ground engagements elements is variably controllable by the at least one controllable clutch.

Favourably, the invention allows for an improved split of speed between the front and rear ground engagement elements. The operation of the vehicle is facilitated and can be more independent of the driver's skill. Today, in many cases drivers will drive the vehicle with the differential in the gear box locked all the time, which is very cost inefficient. Splitting the speed of the ground engagement elements can advantageously be provided automatically. The vehicle can provide superior performance, handling, driveability and off-road characteristics, particularly in slippery conditions. As a consequence of the functionality there is less mechanical stress in the entire powertrain which will vastly improve the service life of all related components in the vehicle. The need for maintenance can be reduced. The powertrain according to the invention is characterized by a low complexity and low cost compared to solutions known in the art. The at least one clutch can be operated actively, i.e. force is provided to close the at least one clutch, or passively, i.e. force is provided for releasing the clutch. A passive clutch is advantageous when using the drive axle for transmitting the torque from a parking brake to the ground engaging elements.

The propulsion power source of the vehicle can be a combustion engine, an electric machine or any device which can be used to provide propulsion power for a vehicle powertrain or any combination thereof.

Favourably, the at least one controllable clutch is embodied to variably transmit torque and/or rotational speed in a predefined range of torque and/or rotational speed. For instance, the torque and/or rotational speed can be varied stepwise. Alternatively, the torque and/or rotational speed can be varied continuously. The at least one clutch can be allowed to decrease the amount of transmitted torque and/or rotational speed compared to the torque and/or rotational speed delivered in certain predestined conditions.

Preferably, the at least one controllable clutch is embodied to variably transmit infinitely torque and/or rotational speed in a predefined range of torque and/or rotational speed. The distribution of torque and/or rotational speed can be performed with a particular sensible adjustment of the torque and/or rotational speed to the at least one ground engagement element axle.

According to a favourable embodiment, the at least one controllable clutch can be a mechanical clutch. The controllable clutch can comprise clutch plates, can be embodied as a friction clutch or can be any other type of clutch with variable torque transmission.

At least one controllable clutch can be arranged in a drive shaft connecting a front ground engagement element axle in the rear vehicle section to the front section. It is possible to distribute a balanced torque to the respective axles and thereby achieve an improved performance in off-road and slippery conditions and still preserve full driveability of the vehicle.

The balanced torque distribution and performance can also be improved if at least one clutch can be arranged in the drive shaft connecting a front ground engagement element axle in the rear vehicle section to a rear ground engagement element axle in the rear vehicle section. According to a favourable embodiment, at least one clutch is arranged in the drive shaft connecting the front ground engagement element axle in the rear vehicle section to the front section as well as in the drive shaft connecting the front ground engagement element axle in the rear vehicle section to the rear ground engagement element axle in the rear vehicle section.

Preferably, a monitor device can be connected to the at least one clutch for monitoring torque and/or rotational speed transmitted by the at least clutch.

Favourably, a control device can be provided to automatically control the at least one clutch. The control device can be a separate unit or can be integrated with the monitor device for monitoring torque and/or rotational speed transmitted by the at least clutch.

Alternatively, a manual device can be provided to manually control the at least one clutch. The driver can choose the amount of torque and/or rotational speed transmitted by the at least one clutch.

According to another aspect of the present invention, a method is provided for controlling a frame-steered vehicle, which comprises a powertrain configured to provide drive torque to a transverse axle in a front vehicle section and at least one transverse axle in a rear vehicle section, wherein at least one longitudinal drive shaft is connected to the at least one transverse axle in the rear vehicle section. The method comprises the step of variably adjusting at least one controllable longitudinal clutch between an engaged operational state and a disengaged operational state in order to variably transmit torque and/or rotational speed to said axles.

Favourably, the longitudinal slip of the ground engagement elements can be reduced or avoided and stress in the drive train can be reduced. The lifetime of components in the drive train as well as of the ground engagement elements is improved due to reduced stress-induced wear.

Preferably, the at least one controllable clutch can be controlled depending on the steering angle.

Preferably, the at least one controllable clutch can be controlled depending on at least one of axle speed, vehicle speed, tire slip, power source load, transported load of the vehicle, inclination angle.

The at least one clutch can be controlled automatically or, alternatively, can be controlled manually.

The invention can be applied to wheel-borne vehicles, track-borne vehicles and vehicles running on rails. Primarily wheel-borne vehicles are intended. The invention is specifically directed to mobile frame-steered work machines, such as articulated haulers, wheel loaders etc. The invention is particularly applicable in vehicles with a multitude of driven axles and will below be described for a frame-steered articulated hauler for the purpose of exemplification. The invention is primarily intended for vehicles used off-road in rough conditions. A fundamental problem for all vehicles with drive at a number of ground contact points is how the driving power is distributed. Advantageously the rotational speeds of the ground engagement elements can be controlled so that the slip in the longitudinal direction is the same at all ground contact points. Favourably, excessive slip at individual ground contact points can thus be prevented.

Further, when a peak torque, particularly an overload, is detected somewhere in the powertrain, the at least one controllable clutch can be used to avoid harmful load levels on powertrain components. Favourably, when a torque peak is detected, one could use this signal to limit the output torque of the power source of the vehicle.

The at least one controllable clutch can be controlled in a manner so that propulsion is transmitted to the front axle only, which is applicable in certain driving conditions where front axle drive is sufficient for the task to be performed. This can be advantageous for a reduced fuel consumption in such cases.

BRIEF DESCRIPTION OF THE DRAWINGS

The present invention may best be understood from the following detailed description of the embodiments, but not restricted to the embodiments, wherein is shown.

DETAILED DESCRIPTION

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
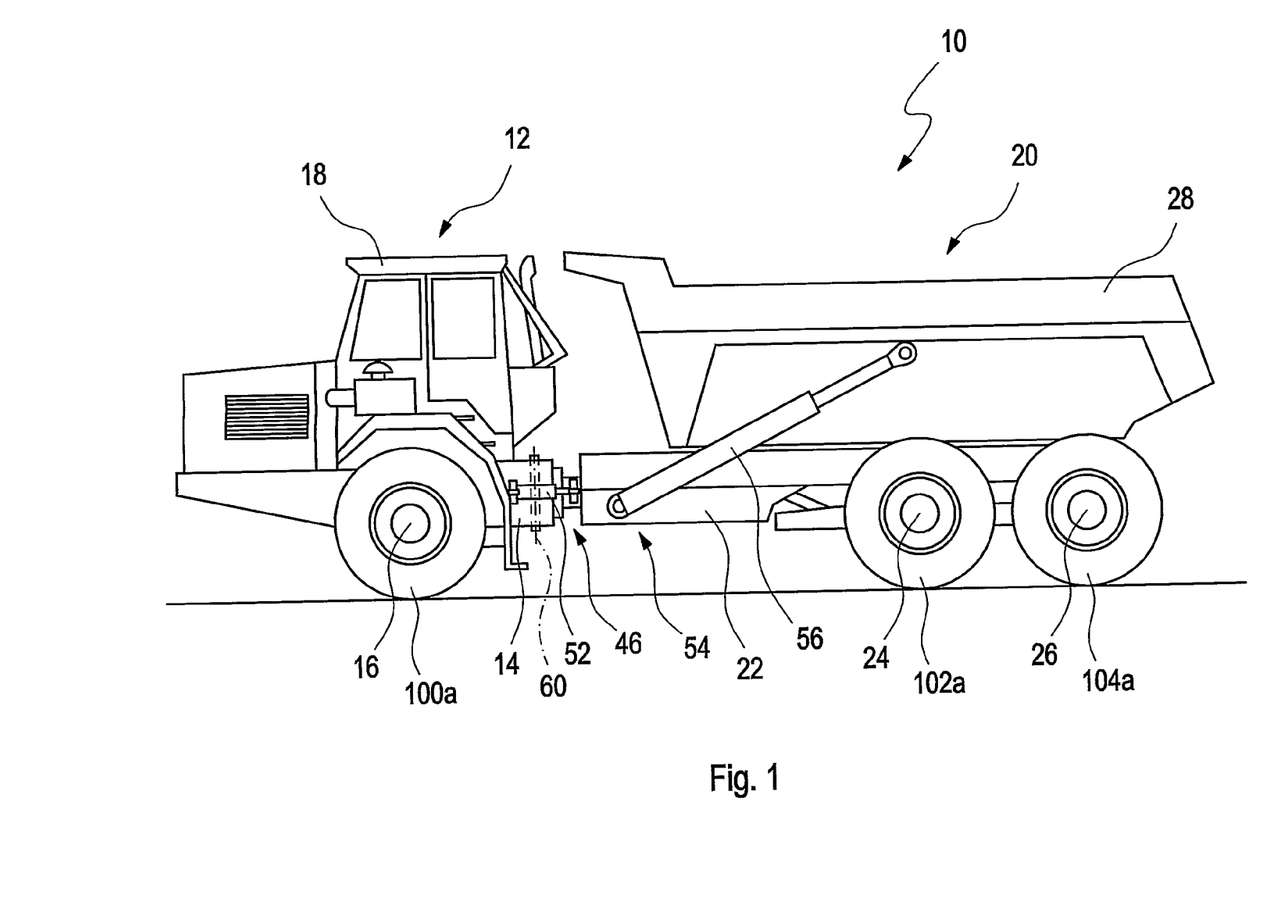
FIG. 1 a side view of a preferred vehicle according to the invention, embodied as an articulated hauler.

FIG. 1 shows a vehicle 10 preferably embodied as a frame-steered articulated hauler, also called dumper, in a side view according to the invention. By way of example, the ground engagement elements are embodied as wheels.

The vehicle 10 embodied as a frame-steered articulated hauler comprises a front vehicle section 12 comprising a front frame 14, a front wheel axle 16 as front ground engagement axle 16 in the front vehicle section 12 and a cab 18 for a driver. The vehicle 10 also comprises a rear vehicle section 20 comprising a rear frame 22, a front wheel axle 24, a rear wheel axle 26 as front and rear ground engagement element axles in the rear vehicle section 20 and a tillable platform body 28.

The front and rear wheel axles 24, 26 of the rear vehicle section 20 are connected to the rear frame 22 via a bogie arrangement (not shown), and will below be referred to as front wheel axle 24 (ground engagement element axle 24) and rear wheel axle 26 (ground engagement element axle 26).

Each of the front wheel axles 16, the front wheel axle 24 and the rear wheel axle 26 comprises pairwise left and right ground engagement elements 100, 102, 104 embodied as wheels. In the side view, only the left ground engagement elements 100a, 102a, 104a are depicted. Generally, the term "ground engagement elements" can include wheels, caterpillar tracks etc.

The front frame 14 is connected to the rear frame 22 via a first rotary joint 46 which allows the front frame 14 and the rear frame 22 to be rotated relative to one another about a vertical axis 60 for steering (turning) the vehicle 10. A pair of hydraulic cylinders 52 is arranged on respective sides of the rotary joint 46 for steering the vehicle 10. The hydraulic cylinders are controlled by the driver of the vehicle via a wheel and/or a joystick (not shown).

A second rotary joint 54 is adapted in order to allow the front frame 14 and the rear frame 22 to be rotated relative to one another about an imaginary longitudinal axis, that is to say an axis which extends in the longitudinal direction of the vehicle 10.

Figure 4:
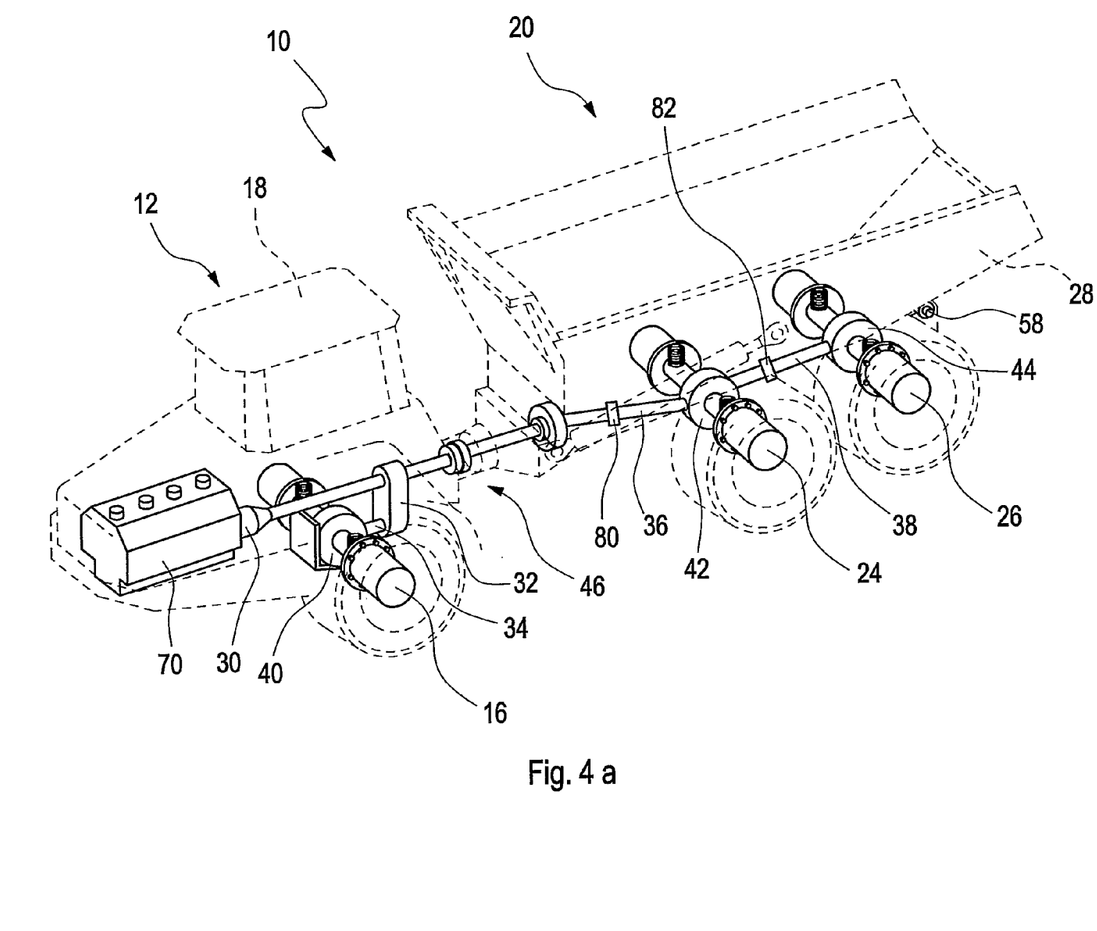
FIG. 4a, 4b a preferred powertrain of the articulated hauler of FIGS. 1 and 2 exhibiting two clutches in drive shafts (FIG. 4a) and a schematic sketch of the powertrain (FIG. 4b).

The platform body 28 is connected to the rear frame 22 via an articulation 58, see FIG. 4a, on a rear portion of the rear frame 22. A pair of tilting cylinders 56 is connected with a first end to the rear frame 22 and connected with a second end to the platform body 28. The tilting cylinders 56 are positioned one on each side of the central axis of the vehicle 10 embodied as a frame-steered articulated hauler in its longitudinal direction. The platform body 28 is therefore tilted/tipped in relation to the rear frame 22 on activation of the tilting cylinders 56.

Figure 2:
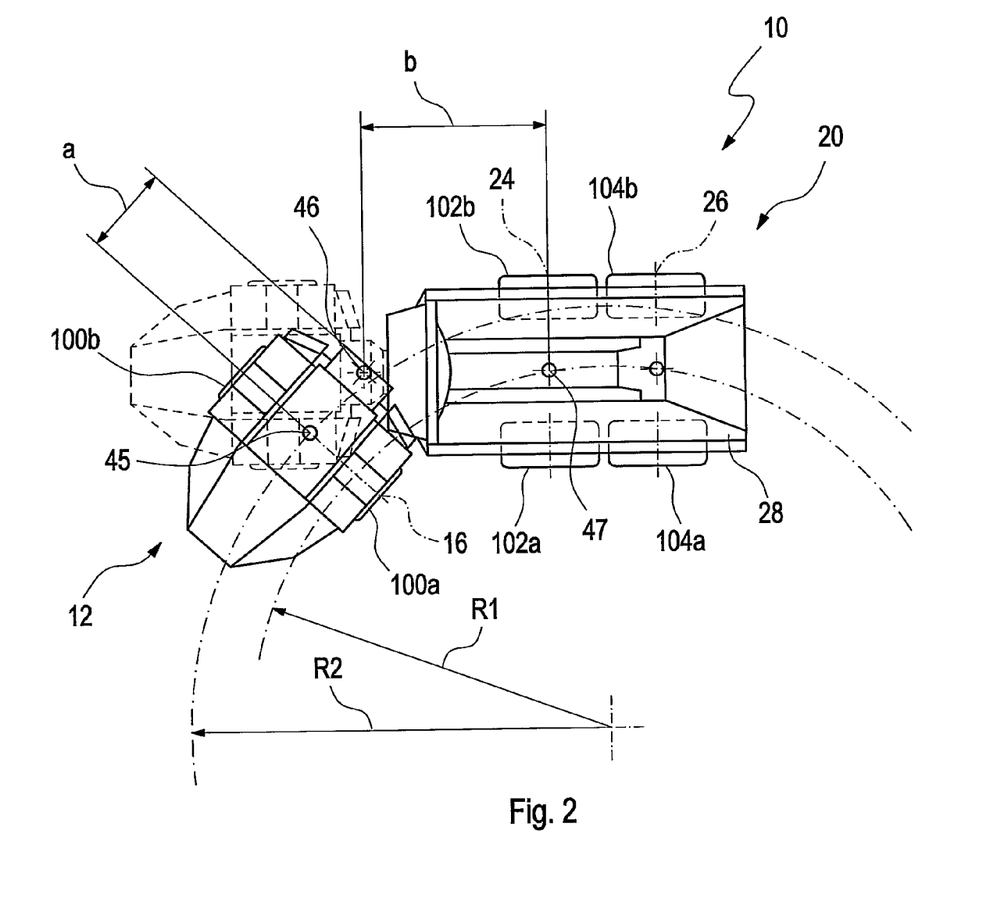
FIG. 2 a top view of the articulated hauler of FIG. 1.

FIG. 2 shows a top view of the vehicle 10 of FIG. 1. The two front and rear sections 12, 20 of the vehicle 10 are connected by way of a vertical articulated shaft 46 (rotary joint 46). The front and rear sections 12, 20 of the vehicle 10 are also connected to one another in a known manner so that they can pivot about a horizontal articulated shaft (not shown), so that the front and rear sections 12, 20 can be rotated in relation to one another about the longitudinal axis of the vehicle 10. Hydraulic cylinders (see FIG. 1), which are arranged on either side of the articulated shaft, are used for steering the vehicle 10 when cornering, the front section 12 of the vehicle 10 being angled about the vertical articulated shaft 46.

According to the state of the art, the drive torque delivered by the vehicle engine is transmitted to the first wheel axle 24 arranged on the rear section 20 of the vehicle 10 by way of a mechanical transmission comprising a first propeller shaft, which connects the vehicle gearbox to the differential of the wheel axle 24. A second propeller shaft is arranged between the first wheel axle 24 and a further wheel axle 26 arranged on the rear section 20, for transmission of the drive torque delivered by the engine. Each of the axles 24, 26 is provided with wheels 102a, 102b, 104a, 104b. The front section 12 of the vehicle 10 is provided with a wheel axle 16 having ground engagement elements 100a, 100b.

Since the distance between each wheel axle 24, 26 and axle 16 and the vertical shaft 46 varies greatly, the axles 24, 26 and 16 will follow essentially different turning radius R1, R2 when cornering.

Thus the axles 24, 26 on the rear section 20 of the vehicle 10 follow the turning radius R1, while the axle 16 on the front section 12 of the vehicle 10 follows the turning radius R2. Due to the fact that the turning radius R2 is substantially larger than the turning radius R1, the ground engagement elements 100a, 100b must cover a significantly longer distance than the ground engagement elements 102a, 102b, 104a, 104b on rear section 20 of the vehicle 10. In order to prevent these differences giving rise to torque load in the power transmission from the engine to the individual ground engagement elements 100a, 100b, 102a, 102b, 104a, 104b, there is a need for an individual adjustment of the rotational speed on each axle 16, 24, 26.

The different distances and radii can cause stress inside the drive train. For instance, the distance a between the centre 45 of the axle 16 and the rotary joint 46 is smaller than the distance b between the rotary joint 46 and the centre 47 of the axle 24.

Figure 3:
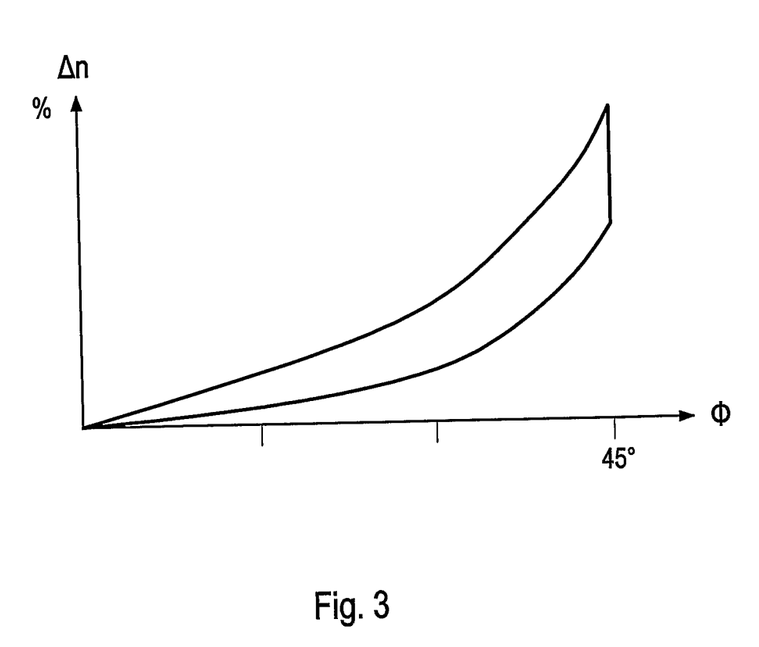
FIG. 3 a characteristic curve displaying a permissible area for control of rotational speed versus a steering angle.

FIG. 3 illustrates a characteristic curve displaying a permissible area for control of rotational speed versus a steering angle $\phi$ of the vehicle 10 displayed in FIGS. 1 and 2. The permissible area is enclosed between the lower and the upper curve. The higher the steering angle $\phi$, the more deviation of the rotational speed occurs.

FIGS. 4a and 4b show diagrammatically the powertrain of the vehicle 10 embodied as a frame-steered articulated hauler. Generally, the term "powertrain" means the entire power transmission system from the power source of the vehicle to the ground engagement elements. The powertrain therefore includes the power source, clutch, gearbox (and any transfer gearbox present), propeller shaft (or propeller shafts), transverse drive shafts etc. Hydraulic, electric and other drive systems are also included within the term powertrain.

A propulsion power source 70 in the form of an internal combustion engine, in this case a diesel engine, is adapted for propulsion of the vehicle 10. The powertrain comprises a main gearbox 30 in the form of an automatic gearbox, which is operationally connected to an output shaft from the power source 70. By way of example, the main gearbox 30 has six forward gears and two reverse gears. The powertrain also comprises a transfer gearbox 32 for distributing driving power between the front axle 16 and the two wheel axles 24, 26.

A first, second and third drive shaft 34, 36, 38 (propeller shafts) extend in the longitudinal direction of the vehicle and are each operationally connected to the transfer gearbox 32 (which is also called a distribution gearbox or an intermediate gearbox) and a central gear 40, 42, 44 in each of the wheel axles 16, 24, 26. A pair of transverse drive shafts (stick axles) extends in opposite directions from the respective central gear. Each of the transverse drive shafts drives one of said wheels.

A first clutch 80 is arranged in the drive shaft 36 connecting the transfer gearbox 32 to the front wheel axle 26 in the rear vehicle section 20. A second clutch 82 is arranged in the drive shaft 38 connecting the front wheel axle 24 in the rear vehicle section 20 to the rear wheel axle 26 in the rear vehicle section 20.

The clutches 80, 82 can transmit torque in a predefined range of torque depending on predetermined operation conditions of the vehicle 10. Preferably, the clutches 80, 82 are mechanical clutches and can transmit torque infinitely continuous between 0% and 100% of the torque applied to the clutch input.

A monitor device 90 is connected to the two clutches 80 and 82 for monitoring torque transmitted by the clutches 80 and 82. Preferably, a rotational speed sensor and/or a torque sensor are arranged before and after each of the clutches 80 and 82. The signals of the sensors are transmitted to the torque monitor system 90.

The automatic control algorithm, particularly in the ECU (electronic control device) can secure all wheel traction and prevent tire slip in slippery conditions by distributing the torque infinitely to all wheels depending on at least the steering angle and/or inclination angle of the vehicle 10 and/or tire slip and/or axle speed and/or power source load and/or transported load of the vehicle 10 and/or steering angle φ (see FIG. 3) or other signals or conditions.

A manual device (not shown), such as a lever or an adjusting knob, can be provided to allow the driver to manually control the clutches 80 and 82. Alternatively or additionally, a control device can be provided to automatically control the clutches 80 and 82.

The invention favourably allows for better driveability as the rotational speed of the rear ground engagement elements, e.g. wheels, can be reduced and understeering can be avoided. A longer life of the powertrain components can be achieved. Further, by reducing or avoiding the slip of the ground engagement elements, wear on the ground engagement elements is reduced. For example, by reducing tire wear (in case of ground engagement elements embodied as wheels) unnecessary maintenance breaks and costs for replacing damaged tires can be saved.

An additional differential unit in the wheel axles for realization of different rotational speed in different wheel axles can be renounced. A longitudinal differential unit in the transfer gear box for realization of different rotational speed in different wheel axles can be renounced. Favourably, the controllable clutch can replace any dog clutch of an automatic traction control (ATC) unit comprising a dog clutch as well as any longitudinal differential unit coupled to this ATC. An overload protection can be provided so that powertrain components behind the one or more clutches in the wheel axles can be compact and not oversized.

The invention claimed is:

1. A frame-steered vehicle comprising a powertrain configured to provide drive torque to a transverse axle in a front vehicle section and at least one transverse axle in a rear vehicle section, wherein at least one longitudinal drive shaft is connected to the at least one transverse axle in the rear vehicle section, wherein at least one controllable longitudinal clutch is arranged in the at least one longitudinal drive shaft, the clutch being variably adjustable between an engaged operational state and a disengaged operational state for varying the transmitted rotational speed stepwise or continuously, wherein the at least one controllable clutch is embodied to variably transmit torque and/or rotational speed in a predefined range of torque.

2. The vehicle according to claim 1, wherein the at least one controllable clutch is embodied to variably transmit infinitely torque and/or rotational speed in a predefined range of torque.

3. The vehicle according to claim 1, wherein a torque is variably controllable by the at least one controllable clutch.

4. The vehicle according to claim 1, wherein a rotational speed of the ground engagements elements is variably controllable by the at feast one controllable clutch.

5. The vehicle according to claim 1, wherein the at least one clutch is a mechanical clutch.

6. The vehicle according to claim 1, wherein the vehicle has a front wheel axle in the rear vehicle section and a rear wheel axle in the rear vehicle section, and at least one of the clutches is arranged in a drive shaft connecting the front wheel axle in the rear vehicle section to the rear wheel axle in the rear vehicle section.

7. The vehicle according to claim 1, wherein a control device is connected to the at least one controllable clutch for monitoring torque and/or rotational speed transmitted by the at least controllable clutch.

8. The vehicle according to claim 1, wherein a control device is provided to automatically control the at least one controllable clutch depending on at least one of steering angle, vehicle speed, engine torque.

9. The vehicle according to claim 1, wherein a manual device is provided to manually control the at least one controllable clutch.

10. The vehicle according to claim 1, wherein the vehicle is a work machine.

11. The vehicle according to claim 1, wherein the vehicle is an articulated hauler.

12. A frame-steered vehicle comprising a powertrain configured to provide drive torque to a transverse axle in a front vehicle section and at least one transverse axle in a rear vehicle section, wherein at least one longitudinal drive shaft is connected to the at least one transverse axle in the rear vehicle section, wherein at least one controllable longitudinal clutch is arranged in the at least one longitudinal drive shaft, the clutch being variably adjustable between an engaged operational state and a disengaged operational state for varying the transmitted rotational speed stepwise or continuously, wherein the vehicle has a front wheel axle in the rear vehicle section and a rear wheel axle in the rear vehicle section, and at least one of the clutches is arranged in a drive shaft connecting the front wheel axle in the rear vehicle section to the front section.

13. A method for controlling a frame-steered vehicle comprising a powertrain configured to provide drive torque to a transverse axle in a front vehicle section and at least one transverse axle in a rear vehicle section, wherein at east one longitudinal drive shaft is connected to the at least one transverse axle in the rear vehicle section, comprising variably adjusting at least one controllable longitudinal clutch between an engaged operational state and a disengaged operational state for varying the transmitted rotational speed to the axles stepwise or continuously, wherein the at least one controllable clutch is controlled depending on steering angle.

14. The vehicle according to claim 13, wherein the at least one clutch is controlled depending on at least one of axle speed, vehicle speed, inclination angle between the front and the rear vehicle sections, tire slip, power source load, transported load of the vehicle.

15. The vehicle according to claim 13, wherein the at least one clutch is controlled manually.

16. The vehicle according to claim 13, wherein the at least one clutch is controlled automatically.

17. A method for controlling a frame-steered vehicle comprising a powertrain configured to provide drive torque to a transverse axle in a front vehicle section and at least one transverse axle in a rear vehicle section, wherein at least one longitudinal drive shaft is connected to the at least one transverse axle in the rear vehicle section, comprising variably adjusting at least one controllable longitudinal clutch between an engaged operational state and a disengaged operational state for varying the transmitted rotational speed to the axles stepwise or continuously, wherein the at least one controllable longitudinal clutch transmits, to a clutch output, 100% of torque applied to a clutch input when in a fully engaged operational state and transmits 0% of torque applied to the clutch input when in the disengaged operational state, the method comprising variably adjusting engagement of the at least one controllable longitudinal clutch to at least one engagement state between the fully engaged operational state and the disengaged operational state so that the at least one controllable longitudinal clutch transmits less than 100% and greater than 0% of torque applied to the clutch input.

18. A frame-steered vehicle comprising a powertrain configured to provide drive torque to a transverse axle in a front vehicle section and at least one transverse axle in a rear vehicle section, wherein at least one longitudinal drive shaft is connected to the at least one transverse axle in the rear vehicle section, wherein at least one controllable longitudinal clutch is arranged in the at least one longitudinal drive shaft, the clutch being variably adjustable between an engaged operational state and a disengaged operational state for varying the transmitted rotational speed stepwise or continuously, wherein the at least one controllable longitudinal clutch transmits, to a clutch output, 100% of torque applied to a clutch input when in a fully engaged operational state and transmits 0% of torque applied to the clutch input when the disengaged operational state, and less than 100% and greater than 0% of torque applied to the clutch input at least one engagement state between the fully engaged operational state and the disengaged operational state.

* * * * *